United States Patent [19]

Zuvela et al.

[11] 4,181,014
[45] Jan. 1, 1980

[54] REMOTE WELL SIGNALLING APPARATUS AND METHODS

[75] Inventors: Bernard R. Zuvela; Raymond W. Teys, both of Fountain Valley; Richard A. Johnson, Long Beach, all of Calif.

[73] Assignee: Scientific Drilling Controls, Inc., Irvine, Calif.

[21] Appl. No.: 902,687

[22] Filed: May 4, 1978

[51] Int. Cl.$^2$ .................................... E21B 47/00
[52] U.S. Cl. .................................... 73/151; 340/856
[58] Field of Search ............ 340/18 NC; 73/151; 33/304, 305, 306, 307; 166/336; 175/45; 324/10

[56] References Cited

U.S. PATENT DOCUMENTS

| 2,225,668 | 12/1940 | Sabkow et al. | 340/18 NC UX |
|---|---|---|---|
| 2,354,887 | 8/1944 | Silverman et al. | |
| 2,389,241 | 11/1945 | Silverman | |
| 2,411,696 | 11/1946 | Silverman et al. | |
| 3,122,213 | 2/1964 | Hawk | 33/307 X |
| 3,333,239 | 7/1967 | Silverman | 340/18 NC UX |
| 3,699,510 | 10/1972 | Lindsey | 340/18 CM |
| 3,718,194 | 2/1973 | Hering et al. | 175/45 |
| 3,724,086 | 4/1973 | Lichte, Jr. | 33/304 |
| 3,732,728 | 5/1973 | Fitzpatrick | 73/151 |
| 3,765,494 | 10/1973 | Kielman, Jr. | 175/45 X |
| 3,791,043 | 2/1974 | Russell | 33/312 |
| 3,793,632 | 2/1974 | Still | 340/18 NC |
| 3,817,345 | 6/1974 | Bailey | 181/0.5 NP |
| 3,831,138 | 8/1974 | Rammner | 340/18 LD |
| 3,862,499 | 1/1975 | Isham et al. | 33/312 |
| 3,866,678 | 2/1975 | Jeter | 166/66 |
| 3,993,127 | 11/1976 | Chepeler et al. | 73/151 X |

Primary Examiner—Jerry W. Myracle
Attorney, Agent, or Firm—William P. Green

[57] ABSTRACT

Information is conducted upwardly from a location deep within a well by a transmitter which is located in the well and induces electrical currents in the surrounding earth formation. These currents are sensed at an upper location by readout equipment connected to two electrodes which are in electrical contact with the earth at spaced locations. One of the electrodes is at a subsurface location and is connected to the readout equipment by an insulated conductor. In offshore drilling situations, the specified subsurface electrode is at the very least located beneath the surface of the ocean or other body of water through which the well extends, and in most instances is preferably embedded within the earth formation under that body of water, and at a location spaced beneath the seabed. In a presently preferred arrangement, the information which is carried by the electrical signals in the earth is generated by an instrument in the well having both a magnetically actuated sensor and a gravity actuated sensor for indicating the directional orientation of a drill string in the well. These sensors may be adapted to be turned to different rotary settings relative to a carrier structure, to enable pre-setting of the sensors in proper orientation relative to a connected directional drilling assembly.

39 Claims, 16 Drawing Figures

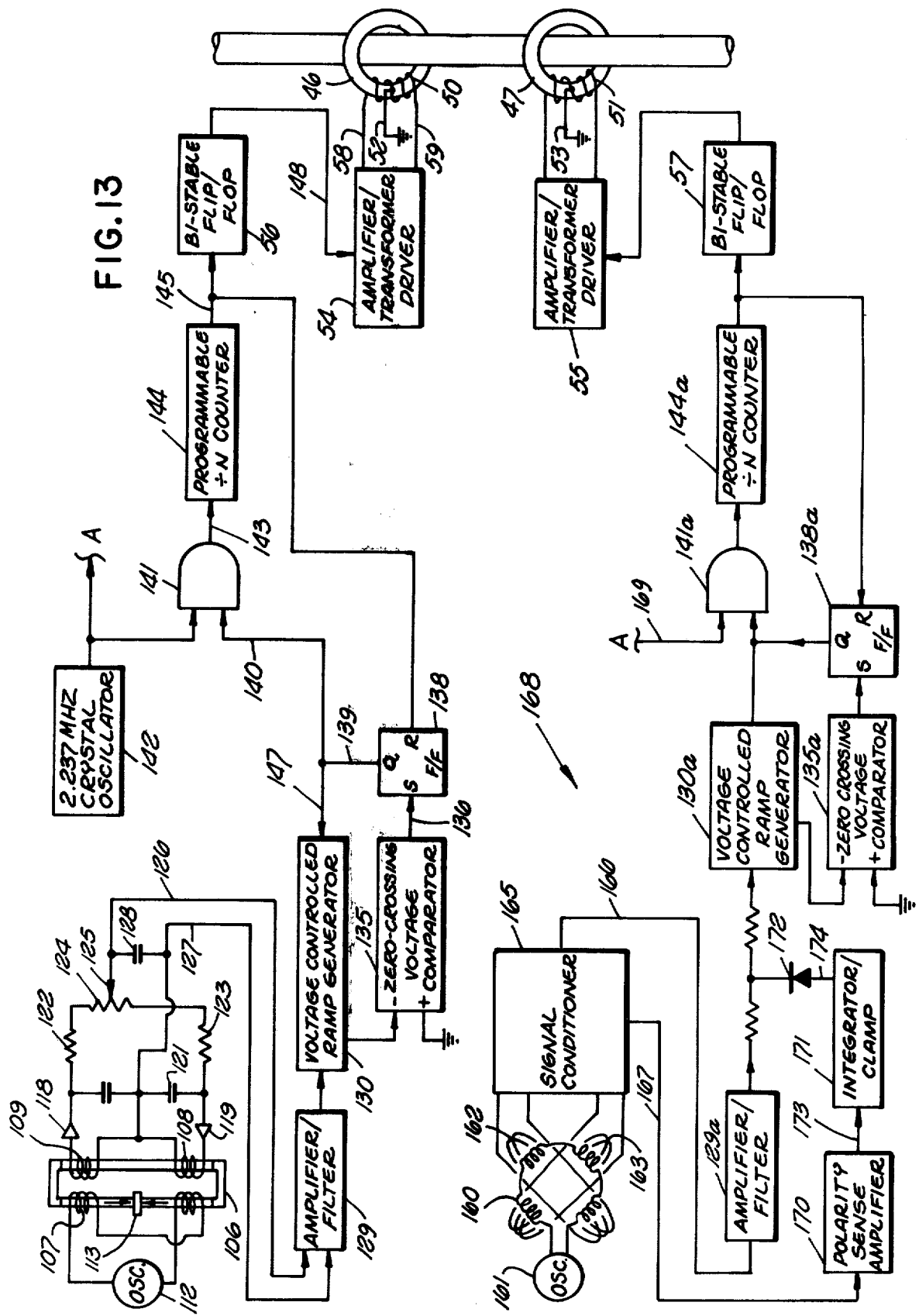

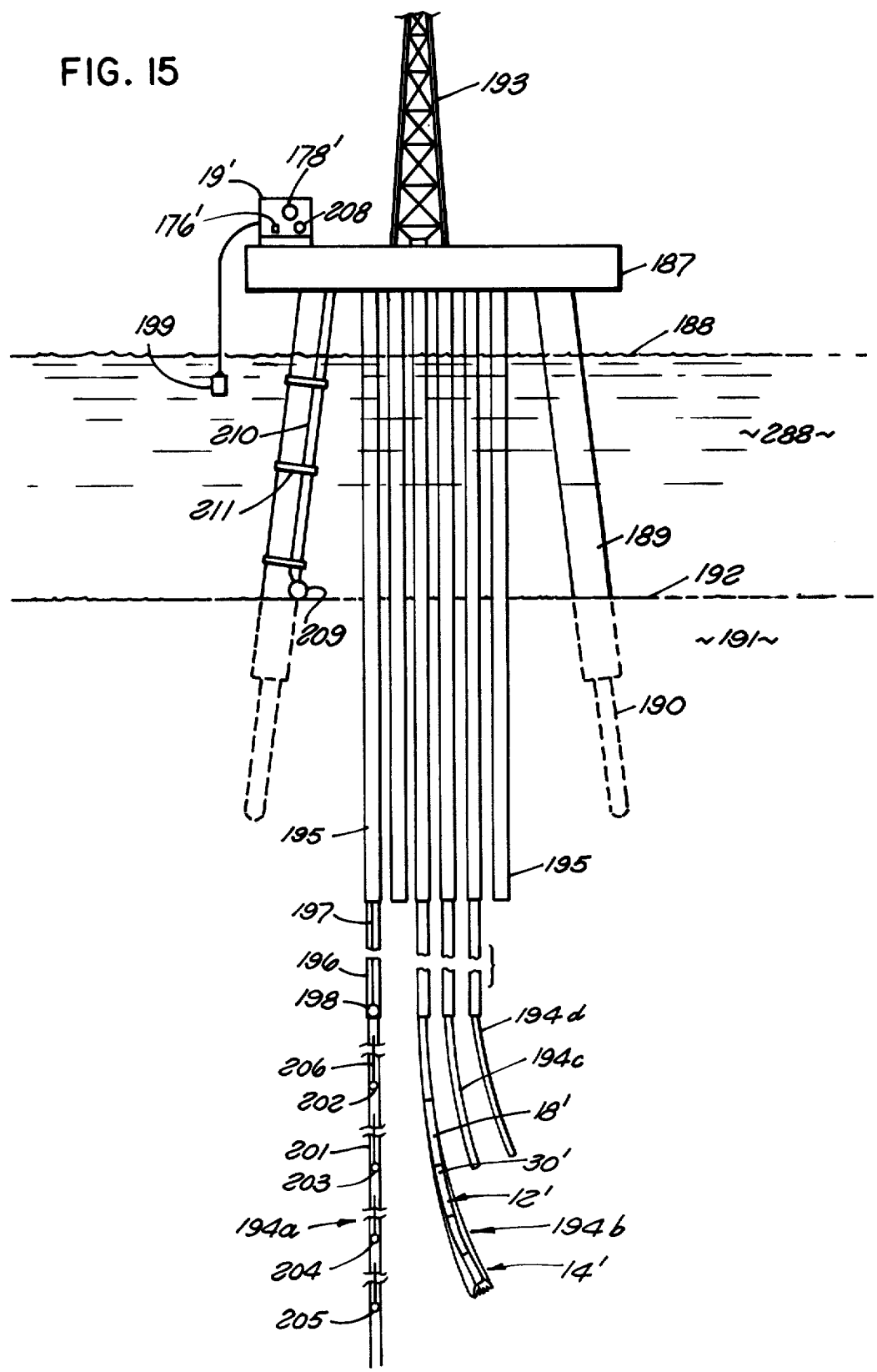

REMOTE WELL SIGNALLING APPARATUS AND METHODS

BACKGROUND OF THE INVENTION

This invention relates to improved apparatus and methods for conveying information upwardly toward the surface of the earth from a location deep within a well, as for instance during a directional drilling operation in which it may be desirable to continuously monitor the direction in which a directional drilling sub is aimed.

During the drilling of a well, it is often desirable to convey upwardly to the surface of the earth information relative to one or more conditions in the well, such as, for example, information on the orientation of a directional drilling unit, or survey information, formation data, or the like. In the past, most of this information has been obtained by lowering into the well on a wireline an instrument capable of responding to a condition or conditions in the well and then transmitting the sensed information upwardly on the wireline to a surface readout. This necessity for lowering and ultimately retrieving a wireline and carried instrument is extremely inconvenient, requires expenditure of a great deal of rig time in taking the desired readings, and has the disadvantage of at least partially obstructing the central passage within the drill string through which fluid must flow, to thus in most cases inhibit or preclude continuance of the drilling operation while the instrument is in position in the drill string.

In order to avoid the above discussed disadvantages of the use of wireline supported instruments, attempts have been made in the past to devise methods of transmitting information or data from a downhole location without the use of a conductor or conductors extending upwardly within the drill string. However, none of these prior proposals has to our knowledge enjoyed any substantial commercial success. One type of previously suggested arrangement is shown in U.S. Pat. Nos. 2,354,887 and 2,411,696, in which a transmitter unit consisting of a coil wound toroidally about an annular magnetic metal core is positioned about a lower portion of a drill string, and acts to induce a signal current in the drill string and the surrounding earth formation. This current is sensed by connection of a readout unit to a pair of electrodes contacting the surface of the earth at spaced locations, or by connection to one such electrode and the upper end of the drill string, or by connection to a subsurface coil disposed about the drill string. Another U.S. Pat., No. 2,389,241, shows a somewhat similar device having transmitting electrodes carried by the drill string deep within the well and having a readout unit connected to electrodes at the surface of the earth. U.S. Pat. No. 3,793,632 shows a device in which a number of vertically spaced repeaters act to successively transmit a signal upwardly through the drill pipe by currents and electromagnetic fields in the pipe. It has also been suggested that signals be transmitted acoustically from a downhole location to the surface of the earth, and in other types of equipment that signals be transmitted by control of pulsations in the drilling fluid.

SUMMARY OF THE INVENTION

A major purpose of the present invention is to provide a well signalling system of the general type shown in U.S. Pat. Nos. 2,354,887 and 2,411,696, in which signals are transmitted by currents travelling through the earth, but in which the manner of reception of those currents is improved to increase the effectiveness of response to the signals and maximize the depth of hole from which signals can be transmitted to the surface of the earth. This result is achieved in large part by positioning two pickup electrodes in electrical contact with the earth at locations and in a manner assuring a substantial potential difference between the two electrodes, to thus increase the flow of current through a receiving unit connected between these electrodes. More specifically, one of the electrodes is positioned at a subsurface location, while the second electrode is located much farther from the downhole transmitter than is the first electrode. The first electrode is connected to the receiving unit by an insulated conductor extending upwardly from the subsurface location to the receiver. In this way, the potential at the subsurface location is communicated directly to the receiving unit from the first electrode through the insulated conductor. The potential of the first electrode may thus differ from that of the second electrode to a much greater extent than if the first electrode is connected to the upper end of the drill string or to the surface of the earth as in U.S. Pat. Nos. 2,354,887 and 2,411,696.

In the case of an offshore well, the "subsurface" electrode may in some instances be positioned within the body of water through which the well extends downwardly, with the word "subsurface" then meaning that the electrode is spaced beneath the upper surface of that body of water. In most offshore installations, however, the subsurface electrode is desirably located directly within the earth formation under the body of water, and is spaced beneath the upper surface of that formation defining the seabed.

To simplify installation of the insulated conductor and connected electrode, and to protect them from damage by contact with a drill string in use, the conductor and electrode may be positioned at the outside of a casing received in a well. The conductor and electrode may be strapped to the casing in insulated relation before it is lowered into the well, with the electrode desirably being positioned for direct contact with the earth formation or at least for indirect electrical connection to the formation through fluids received at the outside of the casing. The conductor and electrode may be located in the same well from which the signals are to be transmitted upwardly, or may be received in a nearby well. In situations in which a number of wells are to be drilled in close proximity, as for instance when several wells are being drilled from the same offshore platform, the subsurface electrode may be located in a first of the wells, and may then function as a pickup electrode for all of the subsequently drilled wells.

A number of the subsurface electrodes may be positioned in a well at vertically spaced locations, each being connected to one side of a receiving unit by an insulated conductor extending upwardly from that particular electrode location. In the discussed offshore drilling situation, several such vertically spaced electrodes may be positioned at the outside of the casing of a first drilled well, and during the drilling of later wells may be utilized successively as the subsurface electrode.

Certain particular features of the invention relate to equipment in which the signals being transmitted to the surface from a downhole location are employed for monitoring a directional drilling operation, to indicate at the surface the direction in which a directional drilling unit is facing and thus enable appropriate rotation of the string to a changed directional orientation assuring advancement of a slant hole along a particular desired course. For this purpose, two directional sensors may be employed, one of which senses the direction of the earth's magnetic field, and the other of which is gravity actuated and senses when the drill string has been turned about its longitudinal axis to a position in which a bent sub of the directional drilling unit faces toward the "high side" of an inclined well. The magnetically actuated sensor may be a fluxgate unit of a known type having coils wound about a magnetic metal core or cores to produce an output dependent upon the directional orientation of the device.

The direction sensing assembly may include a tubular body which is threadedly connected into the drill string at a location above the bent sub, but with the threaded connection or connections between these parts being such that the relative rotary orientation of the sensing unit and the bent sub in the fully made up condition cannot be precisely predicted. To allow compensation for this factor, I prefer to mount the direction sensor or sensors to the body of the instrument for relative rotary adjusting movement, so that each of the sensors can be turned to different adjusted positions, after the instrument body and bent sub have been connected together, and in a manner attaining a precise rotary orientation of the sensors relative to the sub. Markings on the connected parts may be provided to enable measurement of the relative rotary positions of the instrument body and bent sub, to thus indicate the proper rotary adjustment which should be made for each of the sensors.

The gravity actuated sensor is of a unique type having an annular core of magnetizable material containing a slit dividing a portion of the core into two halves, with primary and secondary coils being wound about these halves at opposite ends of the slit, and with a conductive loop wound about one of the portions of the core for swinging movement relative thereto in a relation controlling the flow of magnetic flux through the core in correspondence with gravity induced changes in the position of that movable loop.

BRIEF DESCRIPTION OF THE DRAWINGS

The above and other features and objects of the invention will be better understood from the following detailed description of the typical embodiments illustrated in the accompanying drawings in which:

FIG. 13 is a block diagram representing the electronic circuit of the downhole equipment;

FIG. 15 is a view similar to FIG. 1, but showing application of the invention to an offshore drilling installation.

DESCRIPTION OF THE PREFERRED EMBODIMENTS

Figure 1:
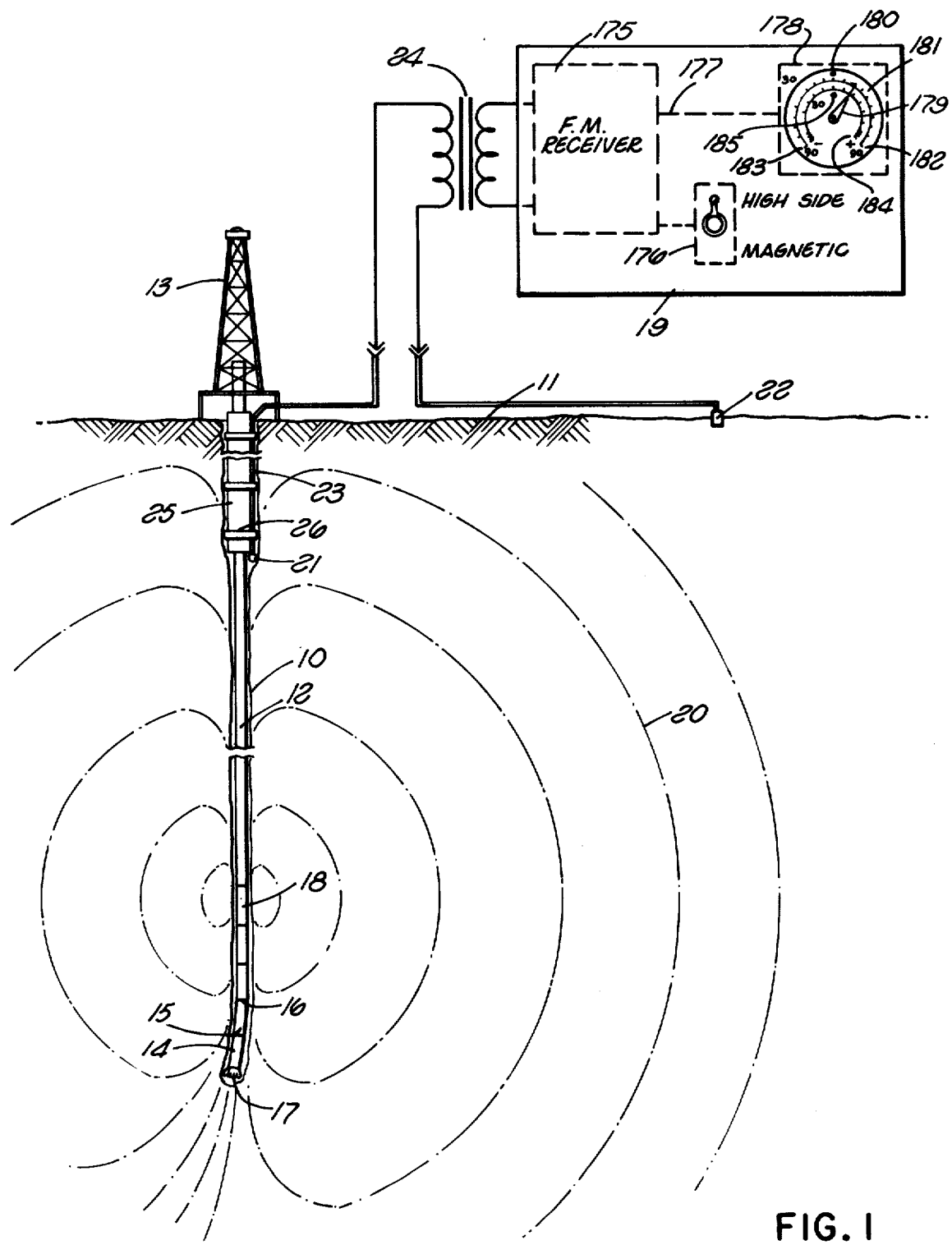
FIG. 1 is a diagrammatic representation of a well installation containing directional drilling equipment having a telemetry sub constructed in accordance with the invention for transmitting directional signals to the surface of the earth.

With reference first to FIG. 1, there is represented at 10 in that figure a well bore extending downwardly into the earth formation from the surface of the earth represented at 11. A tubular drill string 12 extends downwardly from the drilling rig 13, and is formed of a number of threadedly interconnected pipe sections carrying at their lower end a directional drilling unit 14. This unit includes a 'bent sub' 15 taking the form of a tubular pipe section having a slight bend at 16 causing the hole drilled by unit 14 to advance laterally in a predetermined direction as it advances downwardly. At its lower end, the bent sub 15 carries a bit 17 which is driven rotatively relative to the sub by a motor contained in the sub and acts to drill the hole as the drill string advances longitudinally. The motor may be driven by any convenient source of power, as for instance by the pressure of drilling fluid which is forced downwardly through the interior of drill string 12 and then discharges past the bit and upwardly about the outside of the drill string to the surface of the earth.

At a location above the drilling unit 14, the string 12 contains an instrument assembly 18 constructed in accordance with the invention for sensing the direction to which the bent sub 15 is turned in the hole, and then transmitting that information upwardly to a signal receiving or readout unit 19 at the surface of the earth. The signals are transmitted by unit 18 as currents extending through the earth formation along paths such as those represented diagrammatically at 20. These induced earth currents are in low frequency alternating current form, and are sensed as a difference in potential between two electrodes 21 and 22 contacting and electrically connected to the earth at two spaced locations of different potential. In order to assure atttainment of an adequate potential difference, electrode 21 is in contact with the earth at a location spaced well beneath the surface of the earth, preferably at least about 100 feet below the surface, and is connected by an insulated conductor 23 to a first side of the signal receiving unit 19. The second electrode 22 contacts the earth much farther from transmitter 18 than is electrode 21, and in particular may be connected to the surface of the earth at a location spaced horizontally from the well a very substantial distance. The two electrodes 21 and 22 may be formed of any highly conductive metal, such as copper, having a substantial area in contact with the earth's surface. The output from the two electrodes may be delivered to the primary coil of a transformer 24, whose secondary coil is connected to the input of receiver 19.

In the arrangement of FIG. 1, the upper portion of the well 10 contains a surface casing 25 of relatively large size as compared with the main portion of the well therebeneath. The insulated conductor 23 desirably extends downwardly along the outside of this surface casing 25, and carries the subsurface electrode 21 at essentially the lower end of the annulus between the casing and the surrounding bore wall. The conductor 23 and electrode 21 may be secured to the casing in any appropriate manner, as by a number of straps 26 extending about the surface casing and clamping the conductor 23 against the outer surface thereof, while maintaining the conductor against electrical contact with the casing. The conductor thus transmits to receiver 19 a potential corresponding to that in the earth at the lower end of the casing. The electrode 21 and conductor 23 are secured to each section of the surface casing before it is lowered into the well, so that the casing and carried electrode and conductor may be lowered as an assembly into the well and to a position such as that represented in FIG. 1, with the electrode 21 in that final position preferably being in direct contact with the earth, or at least being electrically connected to the earth at that subsurface location through fluids contained in the annulus between the casing and bore wall.

Figure 2:
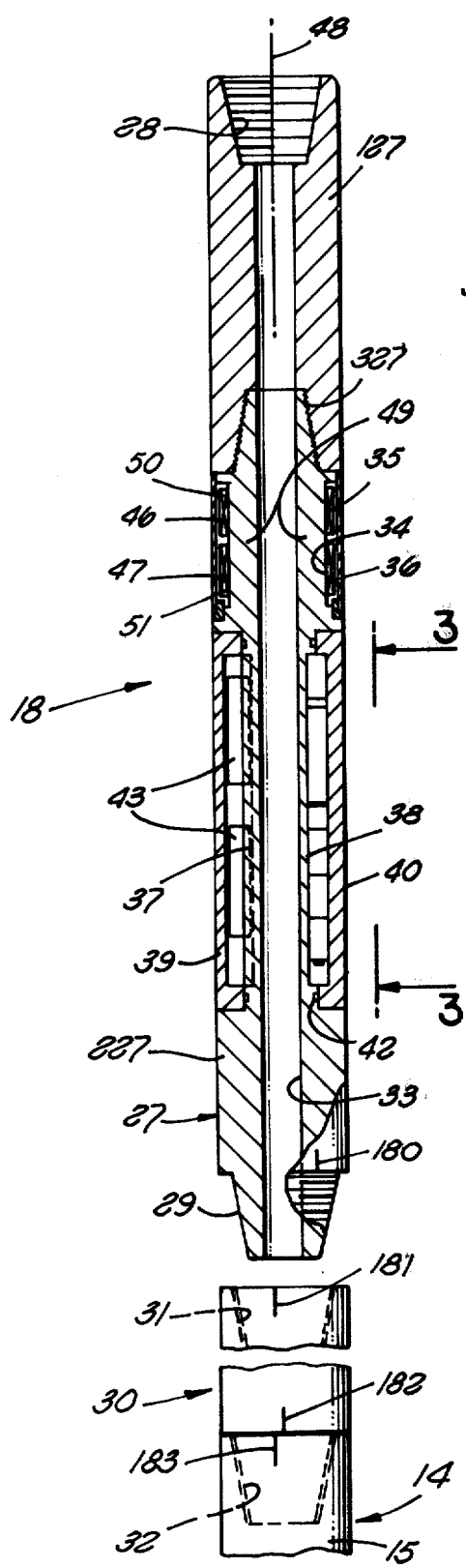
FIG. 2 is an enlarged axial section through the instrument sub of FIG. 1, and showing fragmentarily an upper portion of the directional drilling unit and an intermediate non-magnetic sub.

As seen in FIG. 2, the subsurface instrument unit 18 has a tubular body 27 which may be formed of two sections 127 and 227 threadedly connected together at 327. This composite two section body thus takes the form essentially of a rigid metal sub having an upper internally threaded box end 28 and a lower externally threaded pin end 29 connectable to other sections of the drill string. Since one of the sensors contained in the instrument responds magnetically to the earth's magnetic field, the pipe body or sub 27 is desirably formed of a material which is non-magnetic in character, but is electrically conductive. For example, this body may be formed of monel metal. To effectively isolate the instrument 18 from any magnetic effect of the drilling unit 14 and its carried bit, there may be interposed between instrument 18 and unit 14 another non-magnetic electrically conductive pipe section 30, also typically formed of monel metal. This sub 30 has internal threads 31 at its upper end connectable to the pin end 29 of body 27, and has external threads 32 at its lower end connectable to internal threads formed in the upper end of the bent sub 15 of the drilling unit.

Figure 3:
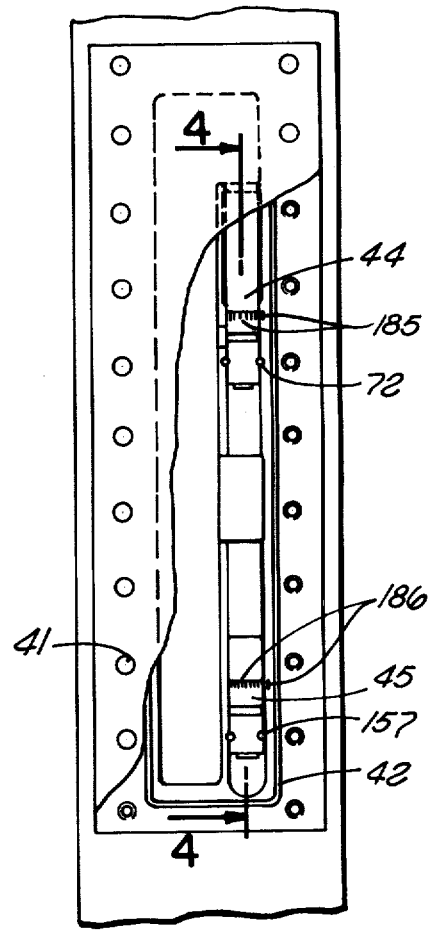
FIG. 3 is a fragmentary side view taken on line 3—3 of FIG. 2.

The electronic and other equipment carried by body 27 of instrument 18 is not contained within and does not obstruct the inner passage 33 within body 27. To receive these electronic and other parts, the body 27 has in its outer surface an annular recess 34 containing two toroidal signal transmitting transformer assemblies 35 and 36. Beneath recess 34, body 27 contains at its opposite sides two diametrically oppositely facing recesses 37 and 38 which are closed in sealed relation by two covers 39 and 40 secured to the body 27 by a number of screws 41 (FIG. 3). Seal rings 42 extend about these recesses in engagement with the covers and body 27 to prevent admission of any fluids from the outside of the instrument assembly into either of the recesses 37 or 38.

The recess 37 contains one or more batteries 43, which energize the electronic circuitry and signal transmitting units, and which are connected to the circuitry within recess 38 by wires extending through an appropriate passage or passages drilled through the material of body 27 between recesses 37 and 38. The batteries are of sufficient capacity to continuously operate the electronic circuitry and transmitters for a substantial period of time, say for example 30 to 50 hours, adequate to complete a desired directional drilling operation on one run of the equipment into the well.

Recess 38 contains two direction sensing units 44 and 45 (FIG. 3), the first of which senses the rotary positioning of the instrument body relative to the 'high side' of the well, and the second of which senses the rotary position of the instrument body relative to the earth's magnetic field. The outputs from these sensing units are fed through electronic circuitry also contained in recess 38 to signal transmitters 35 and 36 respectively.

Each of the transmitters 35 and 36 includes an annular core 46 or 47 of essentially non-retentive magnetic material of the type used in transformers, such as an appropriate soft iron, with the core being centered about the longitudinal axis 48 of body 27 and about the portion 49 of that body which is located radially inwardly of annular recess 34. Each of the transmitters 35 and 36 also includes a coil 50 or 51 which is wound toroidally about the corresponding core 46 or 47 as the primary coil of a toroidal type transformer. More specifically, each turn of each of the coils 50 and 51 is wound about the material of the corresponding core 46 or 47 at one side of axis 48, with successive turns then advancing circularly about that axis to form a toroidal transformer coil configuration. These cores and coils are represented diagrammatically in FIG. 13, which also illustrates the coils as having center taps 52 and 53 dividing each coil in effect into two halves. The coils are driven by units 54 and 55 which are controlled by bi-stable flip-flops 56 and 57. During operation of the equipment, each of the flip-flops 56 and 57 is actuated alternately to its two stable states, and causes amplifier and transformer driver unit 54 or 55 to energize coil 50 or 51 in a manner producing an alternating magnetic flux in the corresponding core 46 or 47. More particularly, in a first of the two stable states of flip-flop 56, unit 54 energizes a first half of coil 50 by current fed through leads 58 and 52 of the coil to pass current through that first half of the coil in a predetermined direction inducing an annular flow of flux within core 46 in a corresponding predetermined direction. When the flip-flop 56 is actuated to its opposite state, unit 54 energizes the second half of coil 50 in an opposite direction by current fed through leads 59 and 52, to cause a reverse flow of flux within the core. Thus, the coil 50 is in effect energized with alternating current, at a frequency dependent upon the rate of oscillation of flip-flop 56 between its two different states. This alternating current and the resulting flux in core 46 induces in the conductive body 27 of instrument assembly 18 an alternating current extending upwardly and downwardly within that body. The current thus induced extends into the earth formation along an infinite number of paths such as those represented at 20 in FIG. 1 for reception by the equipment at the top of the well. The second coil 51 is similarly energized with alternating current acting to induce AC currents in the earth formation at a different frequency dependent upon the frequency of change of flip-flop 57 between its two different states. As will be brought out hereinbelow, the rates of change of the two flip-flops are controlled by sensors 44 and 45, so that the frequency modulation of the signals from the two coils 50 and 51 conveys two types of information to the surface of the earth. The frequencies selected for the two coils are desirably within two relatively low frequency ranges, to maximize the efficiency of transmission of these signals through the earth formation, and are also selected to avoid interference with one another and with other frequencies known to be in the vicinity, such as the usual 60 cycle frequency of commercial power, and its harmonics. In the presently preferred arrangement, the frequency of coil 50 varies between 90 and 94 cycles per second, and the frequency of coil 51 varies between 98 and 102 cycles per second.

Figure 4:
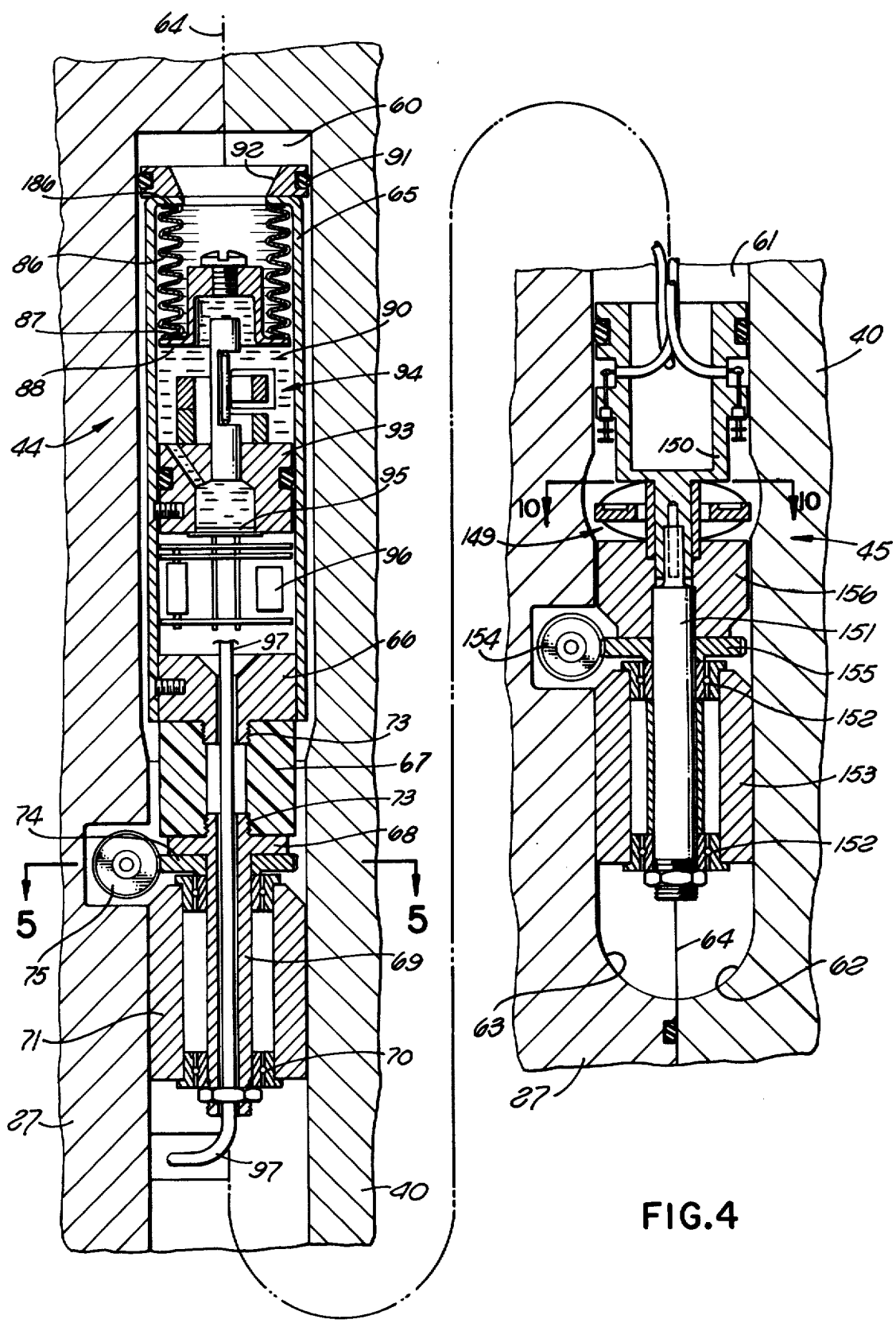
FIG. 4 is an enlarged longitudinal section taken on line 4—4 of FIG. 3.
Figure 6:
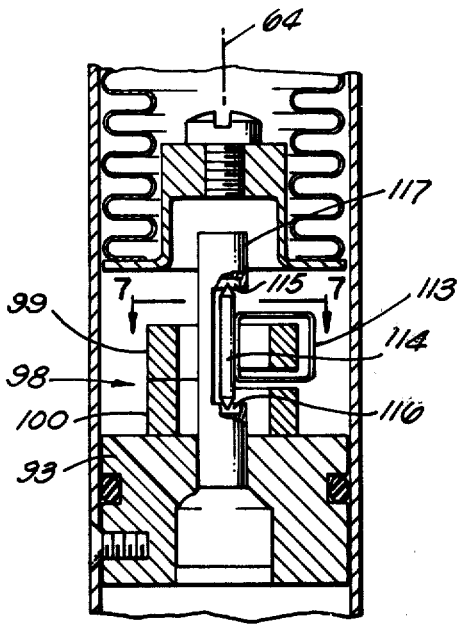
FIG. 6 is an enlarged fragmentary axial section through the gravity actuated high side sensor.
Figure 7:
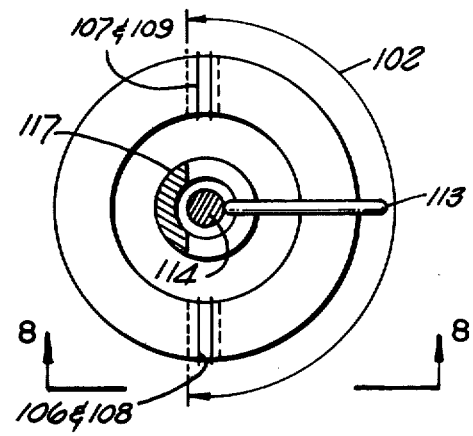
FIG. 7 is a further enlarged transverse section taken on line 7—7 of FIG. 6.
Figure 8:
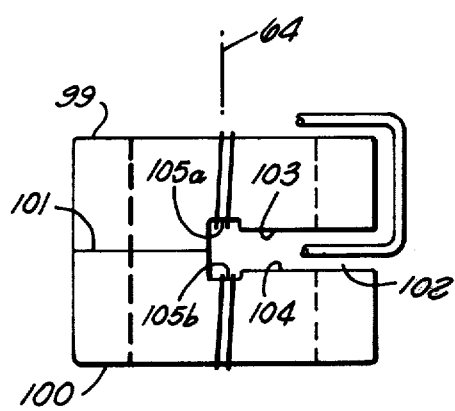
FIG. 8 is a fragmentary side view taken on line 8—8 of FIG. 7.
Figure 9:
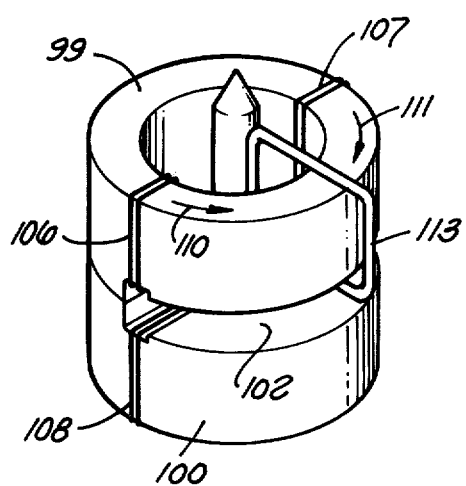
FIG. 9 is a perspective representation of the high side sensor.
Figure 10:
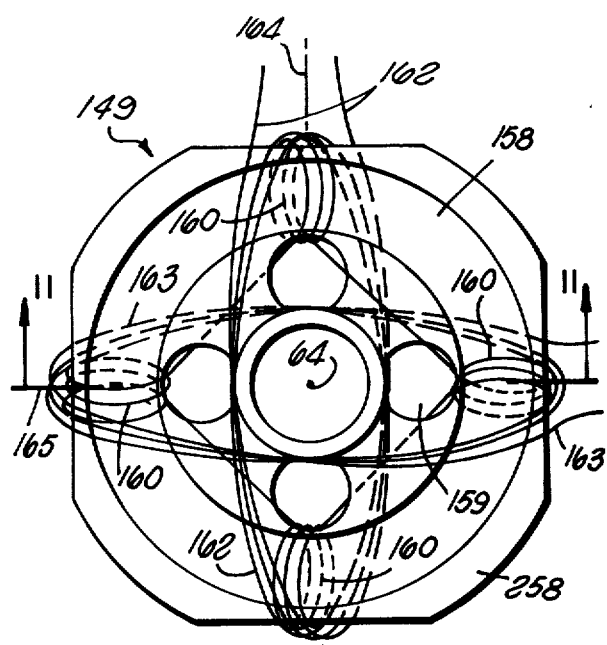
FIG. 10 is a transverse section taken on line 10—10 of FIG. 4, and showing the fluxgate assembly, with the coils being represented diagrammatically.

Referring now to FIG. 4, the two sensors 44 and 45 are retained and confined closely within a cylindrical compartment 60 formed by opposed similar complementary semi-cylindrical recesses 62 and 63 in the inner side of cover 40 and the outer surface of body 27. The remaining electronic components may be similarly confined within appropriately shaped compartments formed between the cover and body. The cylindrical compartment or chamber 60 is centered about a longitudinal axis 64 which is parallel to the main longitudinal axis 48 of body 27, with both of the sensors 44 and 45 being mounted for rotary adjusting movement about axis 64 relative to body 27.

The high side sensor 44 has a rigid tubular case or housing 65, typically formed of an appropriate metal such as brass, and centered about axis 64. At its lower end, this housing 65 may be closed by a bottom plug or wall 66, connected by an annular shock absorbing member 67 to an enlargement 68 formed on a rigid mounting shaft 69. This shaft 69 is in turn journaled for rotation about axis 64 by bearings 70 contained within a mounting block 71 rigidly secured to body 27 by screws 72 (FIG. 3). The shock absorbing member may typically be formed of nylon, and may be connected at its opposite ends to parts 66 and 68 by threads 73.

Figure 5:
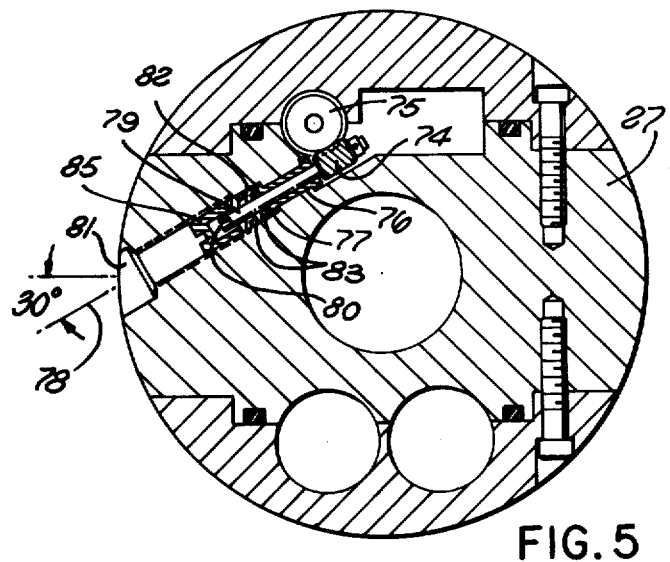
FIG. 5 is a transverse section taken on line 5—5 of FIG. 4.

To turn the high side sensor 44 about axis 64 relative to the carrying body 27, there is provided in body 27 a manually operable adjusting worm 74 (FIGS. 4 and 5) engaging a worm gear 75 attached rigidly to shaft 69. The worm 74 is journaled by a bushing element 76 contained within a passage 77 formed in body 27 for rotation about an axis 78. A shaft 79 projecting from the worm has a screwdriver slot 80 accessible from the outside of the body 27 through an opening 81 to turn the worm and thereby rotate sensor 44 about its axis 64. A plug 82 is received about projection 79 of the worm, and has two O-rings 83 engaging the parts as shown in FIG. 5 to seal the interior of the sensor receiving compartment from the exterior of body 27. After the sensor has been properly set by rotation of worm 74, an additional screwdriver actuable plug 85 may be connected threadedly into passage 77 in body 27 outwardly beyond plug 82, to tighten plug 85 firmly against bushing 76 in sealing relation.

The upper end of casing 65 of the high side sensor as viewed in FIG. 4 may be closed by an annular expansion bellows 86, having its upper end appropriately welded annularly at 186 to the upper end of casing 65, and having its lower end welded annularly and rigidly to an annular hat-shaped wall or closure 88. A screw 89 is threadedly connectable into an opening in the center of part 88 to allow filling of a liquid (90) such as oil into the casing. An O-ring 91 may be received within a groove formed in a part 92 secured rigidly to the upper end of the casing, to engage the wall of the cylindrical recess within which sensor 44 is received, and thus prevent rattling movement of the sensor within the recess.

At a location spaced beneath bellows 86, casing 65 contains a rigid plug member 93, which mounts the gravity responsive high side sensing assembly proper within the oil-filled chamber. The lower end of the oil-filled chamber may be closed by a transverse member 95, through which electrical leads to the assembly 94 extend from an electronic module 96 and a cable 97 which connects to the remainder of the circuitry.

The structure of the gravity actuated sensing assembly 94 is illustrated in greater detail in FIGS. 6 through 9, which show the assembly as including an essentially annular core structure 98 of magnetic material, such as a magnetic ceramic material, with this core structure being rigidly secured in appropriate manner to the previously mentioned member 93, and with the core being centered about the previously discussed axis 64. The core may be formed of two sections 99 and 100, appropriately secured together as by a suitable adhesive, and meeting in a plane 101 disposed transversely of axis 64. Through approximately 180° of their extent about axis 64, the opposed surfaces of core sections 99 and 100 may be cut away to form an arcuate air gap 102 between two parallel opposed faces 103 and 104 formed on parts 99 and 100 and disposed transversely of axis 64. At the opposite ends of this slit 102, the cores may be cut away more deeply at 105a and 105b to form gaps of increased width within which windings may be received. These windings include two primary windings 106 and 107 wound about core section 99 at opposite ends of slit 102, and two secondary windings 108 and 109 wound about the second core section 100 at opposite ends of the slit. The two primary windings 106 and 107 are connected in series with one another, but in opposed relation with respect to the core section 99, so that a common current passing through both coils will induce flux in the core flowing in opposite circular directions at the two coils. That is, when the current in coil 106 is in a direction to induce flux in the direction indicated by arrow 110 of FIG. 9, the same current in winding 107 produces an opposing flux as represented by the arrow 111 of FIG. 9. The series connected coils 106 and 107 are energized by an oscillator 112, as represented in FIG. 13, typically operating at a relatively high frequency such as, for example, 200 kilohertz.

The flux thus produced by primary windings 106 and 107 flows across the air gap 102 to the second core section 100, and then returns laterally in opposite directions through the two secondary windings 108 and 109 for ultimate return to the upper core section 99 at locations beyond the coils. The proportions of the total flux which pass through the two secondary coils 108 and 109 are varied by a gravity actuated pendulum element 113, which forms in effect a highly conductive single turn loop encircling core section 99 at the location of the air gap 102 and movable arcuately by gravity when axis 64 is tilted to different positions along that gap. The single turn loop 113 may, for example, be formed of copper, having a cross-section great enough to conduct a substantial amount of induced current creating a back magnetomotive force resisting flow of the flux from either of the primary coils past loop 113, and thereby isolating the flux produced by each primary coil from the flux of the other coil. The flux from coil 106 must therefore pass downwardly through the gap 102 at the left of loop 113 as viewed in FIG. 9, and the flux from coil 107 must flow downwardly across the gap at the right of the loop. The result is that different amounts of flux flow through the two secondary windings 108 and 109 depending upon the arcuate positioning of loop 113.

The loop 113 is mounted for its arcuate movement by attachment to a mounting shaft 114 (FIG. 6), which is mounted by bearings 115 and 116 to turn about axis 64. The bearings 115 and 116 may in turn be carried by an elongated mounting part 117 secured rigidly to block 93. The loop can thus swing as a pendulum through approximately 180° about axis 64, and has a null position at the center of that travel in which the outputs of windings 108 and 109 are equal.

The circuitry shown in the upper portion of FIG. 13 utilizes the outputs of secondary windings 108 and 109 of the high side sensor in opposite to one another to control the frequency of the alternating current which energizes signal transmitting coil 50. In the null or central position of loop 113, the frequency transmitted by coil 50 is a predetermined intermediate value representative of that null condition. Movement of the loop 113 in its opposite directions changes that frequency either upwardly or downwardly within the predetermined range of frequencies of coil 50. To attain this purpose, the two coils 108 and 109 are connected to a pair of diodes 118 and 119 and capacitors 120 and 121 which rectify and filter the outputs of the two coils, with those outputs being delivered through a pair of identical resistors 122 and 123 to the resistance element of a potentiometer 124 whose movable contact 125 is preset to a position in which the DC output in two lines 126 and 127 is 0 when the loop 113 is in its precisely central position. A smoothing capacitor 128 assures delivery of a non-fluctuating DC output from the circuitry.

Figure 14:
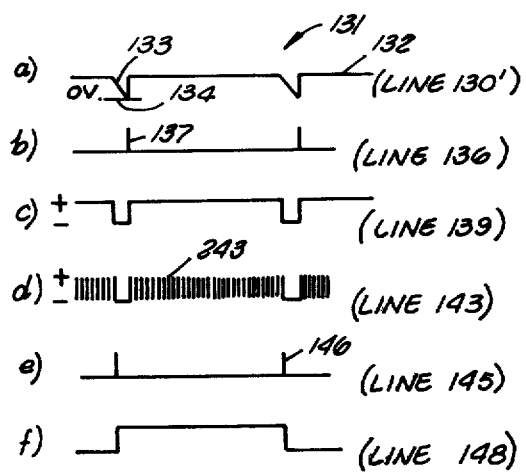
FIG. 14 illustrates diagrammatically the signals present at different points in the FIG. 13 circuit.
Figure 11:
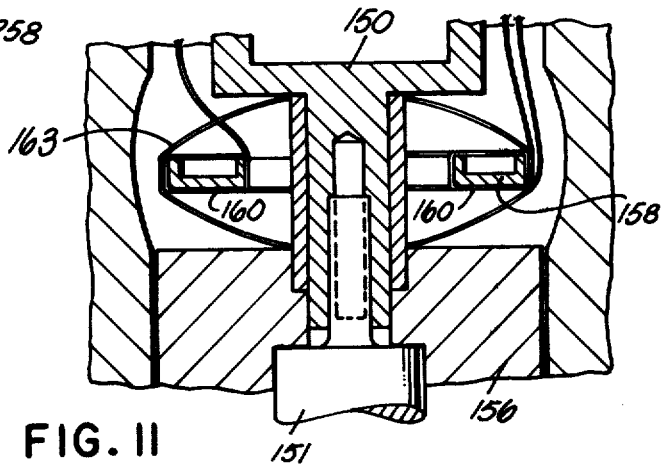
FIG. 11 is a reduced scale section taken on line 11—11 of FIG. 10.
Figure 12A:
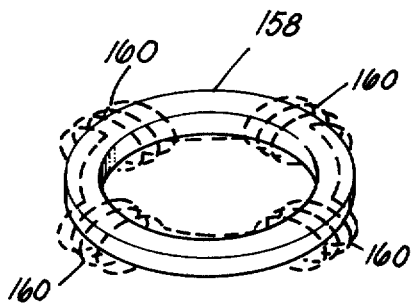
FIGS. 12A and 12B are diagrammatic representations of the windings of the fluxgate assembly, with the primary and secondary windings shown separately in two different views for clarity.
Figure 12B:
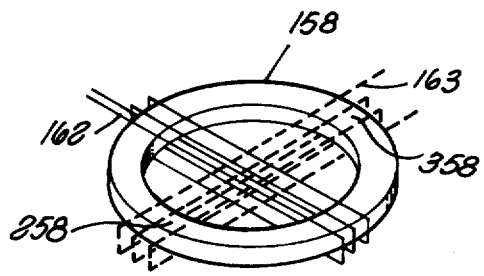

The presence of any DC signal in lines 126 and 127, either plus or minus, indicates deflection of pendulum loop 113 in one direction or the other from its central null position. This DC signal is delivered to an amplifier and filter 129 from which the filtered analog data is conducted to a voltage controlled ramp generator 130. The output of the ramp generator is illustrated on the line designated a in FIG. 14. In the curve 131 shown on that line, the level of the signal delivered to ramp generator 130 at any particular instant is represented at 132. The ramp generator acts to produce a descending voltage ramp 133 which decreases progressively and linearly from the level 132 to a zero level 134. A zero crossing voltage comparator 135 connected to the ramp generator senses when the ramp voltage crosses the zero level 134, and at that instant functions to produce in an output line 136 an instantaneous DC pulse 137 as represented on line b of FIG. 14, which pulse in turn acts to set a flip-flop 138 and thereby change its output line 139 from a negative level to a positive level as seen on line c of FIG. 14. This rise in the voltage level in line 139 acts to reset the ramp generator for a next successive operation, and also acts through a line 140 to turn on an and circuit 141 whose second input comes from a crystal oscillator 142. This oscillator may typically function at a relatively high frequency such as 2.237 megahertz. The resultant output in line 143 from the and circuit is represented at d in FIG. 14, and consists of a series of high frequency pulses or alternations 243 commencing when the and circuit is turned on. These high frequency oscillations are delivered to a programmable divide circuit or counter 144 which produces in its output line 145 a single pulse 146 (see line e of FIG. 14) after counting a predetermined relatively high number of the pulsations 243 in its input side. This pulse 146 resets the flip-flop 138 to turn off and circuit 141, and act through line 147 to commence the next descending voltage cycle of ramp generator 130. The pulses 146 thus intermittently produced in output line 145 from the counter circuit 144 are fed to the previously mentioned bistable flip-flop 56, which produces in line 148 the signal represented at f in FIG. 14, rising in value on one pulse in line 45 and falling in value on the next successive pulse, etc. When the output in line 148 is at one of these levels, a first half of the coil 50 is energized, and when the flip-flop drops to its other level the second half of the coil 50 is energized in the reverse direction, to produce the precisely controlled frequency output signal from the transmitting coil 50.

With reference again to FIG. 4, the second sensor 45 of instrument 18 includes a fluxgate assembly 149 having windings wound in a manner similar to a winding pattern shown in copending application Ser. No. 736,126 filed Oct. 27, 1976 by Bernard R. Zuvela. This assembly 149 is carried by an externally cylindrical part 150 connected to a shaft 151 which is journaled by bearings 152 within a plug 153 in the previously mentioned compartment 60 of unit 18. This sensor turns about the same axis 64 as does the high side sensor 44, and is adjusted rotatably about that axis by a worm 154 and meshing worm gear 155 connected to a part 156 rigidly secured to elements 150 and 151. The mounting block 153 may be retained within the receiving recess or compartment in body 27 by a pair of screws 157 (FIG. 3). Worm 154 can be turned from the exterior of body 27 by a screwdriver actuable element corresponding to that shown at 79 in FIG. 5, with the entire assembly of parts associated with element 79 in FIG. 5 being provided in association with the corresponding second rotary adjusting element which turns worm 154.

The structure of fluxgate assembly 149 is illustrated in some detail in FIGS. 10, 11, 12A and 12B. As seen in those figures, the fluxgate assembly includes an annular core 158 of paramagnetic material, desirably mumetal, which core may be carried by a carrier plate offering rigidity to the structure. This plate is formed of a non-magnetic material, such as aluminum, and is appropriately rigidly secured to parts 150, 151, and 156. Four openings may be provided in the aluminum plate as represented at 159, to allow the primary windings to be wrapped about the core.

The windings include four primary power input windings 160 (FIGS. 10, 11 and 12A) wrapped about the core at locations spaced 90° apart, and all connected in series aiding relation so that a common current through all the coils produces magnetic flux flowing in the same directing circularly about axis 64 within core 158. These series connected primary coils are energized by an oscillator 161, typically operating at a frequency of 1 kilohertz, and acting to produce a rapidly alternating magnetic flux in core 158.

Paramagnetic core 158 is of a material designed and selected to be capable of conducting only a small amount of magnetic flux, specifically small enough that the portion of the core within each input coil becomes saturated with magnetic flux during each half cycle of the alternating current in that coil. This saturation occurs at a time well before the alternating current potential reverses polarity. Core 158 is of a material which can easily be reversed in polarity and repeatedly saturated by the magnetic field as discussed.

Output signals from the fluxgate assembly are produced by two secondary or output windings 162 and 163 (FIGS. 10, 11 and 12B), which are looped diametrically about core 158, in flux linked relation to the core, and essentially along two perpendicular diametrical axes 164 and 165 respectively. When the earth's magnetic field is in a plane containing axes 164 and 64, no electrical output is induced in coil 162 by the fluxgate assembly. In that same position, however, a maximum output is induced in the second output coil 163. This is true because the two diametrically opposite portions 258 and 358 of core 158 which are directly within output coil 163 (the two portions which extend essentially parallel to axis 164) are affected differently by the earth's magnetic field. More particularly, during each half cycle of the alternating current in input coils 160, the earth's magnetic field adds to the field produced by coils 160 in one of the portions 258 and 358 of the core, and reduces the field produced by the coils 160 in the other of these portions. As a result, one of those portions of the core reaches saturation before the other, and the difference in saturation times causes an output signal to be induced in coil 163. The portions of the core which are directly within coil 162, on the other hand, are not affected by the earth's field, and therefore reach saturation at exactly the same instant, with resultant development of no output signal in coil 162. When the fluxgate device is turned through 90° from the discussed position, so that the earth's field then lies in a plane containing axes 64 and 165, an output is produced in coil 162 but not coil 163. In intermediate positions, reduced outputs are produced in both of the coils 162 and 163, having a sine or cosine relationship with respect to the angle through which the fluxgate has been turned from the null position of one of the coils.

The outputs from the two coils 162 and 163 are delivered to a signal conditioner 165 (FIG. 13), which produces a properly conditioned DC level output in line 166 varying in correspondence with the AC energization of coil 162, and a similar DC level output in a second line 167 varying in voltage in correspondence with the AC signal induced in coil 163. The levels of the DC signals in lines 166 and 167 thus accurately represent the direction in which the coils 162 and 163 extend with respect to the earth's magnetic field. Each of these signals is at a null when the corresponding coil 162 or 163 is aligned with the horizontal component of the earth's magnetic field, and becomes positive when the coil is turned in one direction from that null setting, and negative when turned in the opposite direction, with the value of the positive or negative DC voltage in each case corresponding to the sine or cosine of the angle of rotation from the null condition.

The DC analog signal in line 166 (controlled by coil 162) is fed through a circuit 168 corresponding to the previously discussed circuit associated with the high side sensor. More particularly, this circuit includes an amplifier and filter 129a, a voltage controlled ramp generator 130a, a zero crossing voltage comparator 135a, a flip-flop 138a, an and circuit 141a, and a programmable divide by n counter circuit 144a, all corresponding to and functioning in the same manner as the elements 129, 130, 135, 128, 141 and 144 respectively of the high side sensing circuit. The same oscillator 142 which is utilized in conjunction with the high side circuit may also function as one of the inputs to and circuit 141a, being connected to that circuit at 169. The previously mentioned bistable flip-flop 57 and transformer driver 55 may also be the same as the elements 56 and 54 respectively of the high side circuit, with the overall result that the duplicated circuitry functions to respond to variations in the voltage in line 166 and produce a frequency modulated output signal in coil 51 corresponding thereto. When the voltage in line 166 is zero, the frequency of the alternating current signal in coil 51 is at a predetermined precisely controlled value. Any rise in the voltage in line 166 to a positive value causes a corresponding increase in the frequency of the current in coil 51, and any fall in potential to a negative value causes a corresponding decrease in frequency in coil 51.

If the output from fluxgate coil 162 were employed alone, without use of the second coil 163, the critical null voltage in line 166 and the resultant critical output frequency in coil 51 corresponding to that null voltage would be produced in each of two rotary positions of the fluxgate assembly offset 180° from one another. This null voltage and corresponding output frequency would result when axis 164 of coil 162 was aligned with the horizontal component of the earth's magnetic field regardless of which end of coil 162 might be pointing to the north. To avoid this ambiguity, the output of the second fluxgate coil 163 is utilized to determine when a predetermined proper end of the coil 162 is pointing toward the north. For this purpose, the DC analog signal in line 167 representing the output from coil 163 is delivered to a polarity sense amplifier 170, and then to an integrator and clamp circuit 171, which back biases a diode 172 when the output from coil 163 indicates that the fluxgate assembly is within a proper 180° segment of its rotation. Such back biasing of the diode permits the ramp generator 130a to function as discussed in connection with the corresponding ramp generator 130 of the high side circuitry. When, however, the units 170 and 171 sense that the fluxgate is in the wrong 180° segment of its rotation, the signal in line 173 of FIG. 13 goes negative and the signal in line 174 sweeps slowly positive, driving the ramp generator out of its normal frequency range and in effect preventing further operation of the ramp generator and preventing delivery of any output from the circuit to transmitter coil 51.

The signal receiving unit 19 at the surface of the earth may be any appropriate type of equipment adapted to receive and indicate, record or respond to the information contained in the frequency modulated signals transmitted upwardly from the instrument sub 18. In FIG. 1, this unit is typically illustrated as including an FM receiver 175, having two preset tuning circuits, one of which tunes the receiver for reception of signals within the frequency range transmitted by coil 50 of FIG. 2, while the other tuning circuit of receiver 175 tunes that receiver to the frequency range of signals emitted by coil 51 of FIG. 2. The receiver is actuable between these two preset tuned conditions by manual operation of a switch 176. The receiver 175 is designed to produce a direct current analog output in a line 177 leading to a meter 178. When switch 176 is in a condition tuning receiver 175 to reception of the high side information from coil 50, the DC analog signal in line 177 is at a zero potential when the frequency of the signal from coil 50 is at a predetermined intermediate value representing the null or central position of the high side sensing loop 113. If loop 113 moves in one direction from that central position, the signal in line 177 becomes positive, while movement of the loop in the opposite direction causes the signal to become negative, with the positive or negative value in each case being an accurate analog representation of the angle of displacement of loop 113 from its central position. Meter 178 responds to this analog signal by causing its pointer 179 to point toward a zero setting 180 when the loop is in its central position and the DC signal in line 177 is zero, and causing the pointer to move to the right or the left of that position in response to positive or negative signals in line 177, indicating on an arcuate scale 181 the angle of displacement of loop 113 from its central position up to a plus 90° mark on the scale at 182, and a minus 90° mark on the scale at 183.

When the switch 176 is in its magnetic setting, the same pointer 179 of meter 178 indicates on a second scale 184 the directional relationship of fluxgate coil assembly 149 relative to the earth's magnetic field. When coil 162 of that assembly is in its null position of direct alignment with the earth's magnetic field, FM receiver 175 responds to transmission by coil 51 of its predetermined central frequency by producing a zero voltage output in line 177, causing pointer 179 to point to the zero marking 185 on scale 184. Any rotation of coil 162 either to the right or left from that null position causes development of a corresponding positive or negative voltage analong signal in line 177 from receiver 175, with resultant deflection of pointer 179 to the right or the left respectively of the zero marking. As in the case of the first scale 181, the amount of this deflection in either direction is indicated by angle markings on scale 184, up to maximums of 90° to the right or 90° to the left.

To now recapitulate briefly a cycle of operation of the equipment of FIGS. 1 to 14, assume that the well 10 has been drilled by conventional methods along an essentially straight vertical path down to approximately the level illustrated in FIG. 1, and that it is then decided to directionally deflect the hole in a leftward direction in FIG. 1 as it advances downwardly beyond the illustrated depth. If the surface casing 25 has not theretofore been set, it is at that stage lowered into the upper portion of the well, with the insulated conductor 23 and exposed conductive electrode 21 carried at the outside of the casing. The drill string is then prepared for lowering into the well, with the bent sub type drilling unit 14 being connected at the surface of the earth to instrument assembly 18, desirably with the non-magnetic sub 30 therebetween. The threaded connections between units 14, 30 and 18 are made up tightly to assure that the tubular bodies of the two units 14 and 18 are in the precise relative rotary positions in which they will remain during the entire drilling operation, and with the subs so connected the two sensors 44 and 45 are adjusted rotatively about their axis 64 to proper zero setting orientations with respect to the bent sub. Such rotary setting of the sensors is attained in the previously described manner by screwdriver actuation of element 79 of FIG. 5, and the corresponding adjusting part associated with the other sensor. The magnetic sensor is turned to a position in which, with the tool extending directly vertically, coil 162 is in its null output position and axis 164 of that coil is aligned with the horizontal component of the earth's magnetic field, with resultant actuation of pointer 179 to its zero magnetic setting, when the bend 16 of the drilling unit sub is aimed for deflection of the hole in a predetermined desired direction. The high side sensor 45 is set in a rotary position in which, with the axis 48 of instrument assembly 18 inclined, the swinging conductive loop or pendulum element 113 of the high side sensor (FIGS. 6 to 9) is in its central null output position causing a zero high side reading at the surface of the earth when the instrument is turned about the inclined axis 48 to a position in which the connected bent sub 15 is directed toward the high side of the inclined tool.

For setting the sensors to these desired positions relative to the bent sub, appropriate index markings 180, 181, 182 and 183 (FIG. 2) may be provided on adjacent surfaces of elements 27, 30 and 15, to indicate the relative rotary settings of these different parts. The circular offset between markings 180 and 181 on parts 27 and 30 may then be read by an appropriate protractor, or by providing in association with one of these markings a circular scale extending about that particular pipe section and readable in degrees. Similarly, the circular offset between markings 182 and 183 may be read by a protractor or by providing with one of these markings a circular scale extending about the corresponding pipe section and readable in degrees. The two readings thus attained can be utilized to determine the circular or angular offset between body 27 of instrument assembly 18 and the bent sub, and to thus determine the number of degrees which each of the sensors 44 and 45 must be turned about its individual axis relative to body 27 to attain the desired zero settings of those sensors. The sensors themselves may also have markings or scales co-acting with related markings on body 27, as represented at 185 and 186 in FIG. 3, to indicate to a user (when cover 40 is removed) the settings of the sensors relative to the instrument body. When the cover 40 is closed, an operator can adjust either sensor through any desired angle by rotating the associated adjusting worms through a particular number of turns (knowing the reduction ratio of the worm gear assembly).

After the instrument and drilling unit have been interconnected in the discussed manner, and the sensors have been preset for drilling a hole in a desired magnetic direction, the drill string is advanced downwardly to the lower end of the hole, the switch at the surface of the earth is turned to its magnetic position, and the drilling unit 14 is turned to a position in which pointer 179 points toward the zero magnetic setting. This indicates that bent sub 15 is aimed for directional drilling in the predetermined direction for which the fluxgate sensor has been set. The drilling unit 14 is then energized to drill a hole in that direction. After the hole has advanced to a condition in which the instrument assembly is inclined to a substantial extent with respect to the vertical, say for example an angle of five degrees with respect to the vertical, the switch 176 of receiving unit 19 is actuated to its high side condition, in which pointer 179 points toward the zero high side setting when the bent sub is aimed toward the high side of the hole. The drill string is thereafter manipulated to maintain the pointer at that zero setting as the drilling unit continues to drill a hole in the desired direction. If under either magnetic or high side drilling conditions it becomes desirable to change the direction of the hole either to the right or to the left, the drill string can be turned to produce an appropriate movement of the pointer 179 either to the right or the left of the zero setting as desired to give the intended change in course. The operator can thus monitor the direction in which the bent sub is aimed at all times during the drilling operation, and can very effectively control the direction of advancement of the hole.

FIG. 15 illustrates an application of the invention to an offshore drilling installation including a platform 187 supported above the surface 188 of the ocean or other body of water 288 by platform legs 189 and pilings 190 driven downwardly into the earth formation 191 beneath the sea bed 192 defining the upper surface of the earth formation. The rig 193 on the platform is to be utilized for successively drilling a number of wells 194a, 194b, 194c, etc. which initially extend directly downwardly in closely spaced parallel relation through individual drive pipes or conductor pipes 195, and which then are deflected laterally in different directions beneath the lower ends of pipes 195 to tap different producing formations within a relatively large area surrounding the platform.

The rig 193 may first be employed to drill the hole represented at 194a in the left portion of FIG. 15. After that hole has been partially drilled, the surface casing 196 is set in the upper portion of the hole in a manner similar to surface casing 25 of FIG. 1, with an insulated conductor 197 being strapped to the outside of the surface casing and extending downwardly between it and the bore wall and carrying an electrically conductive subsurface electrode 198 at the lower end of the surface casing. Electrode 198 is exposed to direct electrical contact with the earth formation 191 well below its surface 192. If and when the hole 194a is to be deflected laterally in a directional drilling operation, signals received by electrode 198 and a second electrode 199 farther from the toroidal transmitting coils are utilized to energize a receiving unit 19' in the same manner discussed in connection with receiver 19 of the first form of the invention, to thereby indicate on the meter 178' of the receiver the discussed magnetic and high side directional readings. The electrode 199 is typically illustrated as in contact with the ocean at a location near its surface, but may if desired be located deeper in the water, or even in direct contact with the earth formation 191, so long as electrode 199 is on each operation of the equipment located substantially farther from the downhole transmitting coils than is the "subsurface" electrode then connected to the second side of the receiver.

In some instances, especially during the early stages of an offshore drilling operation before there has been an opportunity to position a surface casing and carried electrode in the well, the electrode functioning as the higher potential "subsurface" electrode may itself be located in contact with the body of water 288 at a level above the seabed. Such an electrode is represented at 209 in FIG. 15, being spaced below the surface of the water and typically near the level of the seabed. Electrode 209, and a connected insulated conductor 210 extending upwardly therefrom within the water in insulated relation to readout unit 19', may be attached to one of the legs 189 of platform 187, as by a number of straps 211. When electrode 209 is employed as the subsurface electrode the second electrode 199 should contact the water at a location farther from the downhole transmitter coils than electrode 209, to have a lower electrical potential than electrode 209.

In FIG. 15, it is typically assumed that the first hole 194a is to be drilled directly downwardly for a greater distance than the other wells, so that the first well may be positioned to most effectively function as a signal pickup well for all of the others. The well 194a is shown as containing a main casing 201 appropriately suspended from the surface casing 196 and projecting downwardly to the bottom of the hole, with additional earth contacting electrodes 202, 203, 204, 205, etc. strapped to the outside of the casing 201 at vertically spaced locations beneath electrode 198, say for example every few hundred feet, and with individual insulated conductors 206 extending upwardly from these different electrodes to the surface of the earth and to readout unit 19'. When the hole 194a reaches a level at which it is to be deflected laterally, the lowermost one of the electrodes 198, 202, 203, etc. may be employed as the "subsurface" or higher potential electrode of the pickup system, with electrode 199 being used as the second or low potential electrode.

FIG. 15 shows the apparatus during a directional drilling operation in the nearby well 194b. The drill string 12' illustrated in that well may be identical with the string 12 of FIG. 1, having a bottom drilling unit 14' such as that shown at 14 in FIG. 1, with a bent sub, and having the instrument assembly 18' connected to the bent sub by an intermediate sub 30'. Frequency modulated signal currents produced by the two toroidal coils of assembly 18' flow through the earth formation, and are picked up by electrode 199 and one of the electrodes 198, 202, 203, etc. in well 194a (or electrode 209), with the readout unit 19' at the surface of the earth responding to these signals in the same manner as discussed in connection with unit 19 of FIG. 1. The readout unit 19' may have the same magnetic and high side mode scales as in FIG. 1, with a single pointer operable selectively, under the control of a selector switch 176', to indicate either magnetic direction or high side angle. An additional selector switch 208 may be provided in unit 19! for selecting between the different subsurface electrodes 209, 198, 202, 203, etc. Though during the drilling of the second well 194b the electrodes 209, 198, 202, 203, etc. which are used as "subsurface" electrodes are not positioned in the same well 194b as the signal transmitting coils, each of these electrodes is nevertheless substantially closer to the transmitting coils in well 194b than is the 'far' electrode 199, to thus attain the desired different potential condition for actuating readout unit 19'. The other wells of FIG. 15 may be drilled in the same manner as well 194 by utilizing in each case the electrodes originally positioned in the first well 194a (and electrode 209) as the higher potential signal pickup elements. In each well after the first well 194a, as the drilling progresses downwardly the various electrodes 209, 198, 202, 203, etc. may be used sequentially as the subsurface pickup electrode. At any particular instant, the subsurface electrode which is closest to the level of the toroidal coils on the drill string may be connected to the receiver circuitry for use as the subsurface pickup.

The dimensions and electrical values of the various electrical components illustrated in the drawings may, of course, vary within wide limits, so long as satisfactory overall operation of the equipment is attained. The following structural details and electrical values are given as an example of a presently preferred arrangement:

Coils 160 - 52 turns each of 34 gauge insulated magnet wire
Coils 162 and 163 - 250 turns each of 41 gauge magnet wire
OD of core 158 - 1¼ inches
Thickness of core 158 - 0.015 inches
Radial width of core 158 - 0.150 inches
Material of core 158 - mumetal
Coils 106 and 107 - 26 turns each of 36 gauge magnet wire
Coils 108 and 109 - 20 turns each of 36 gauge magnet wire
Oscillator 112 - 200 kilohertz Diodes 118 and 119 - Type 1N914
Capacitors 120 and 121 - 0.0022 microfarad
Resistors 122 and 123 - 47.5K
Potentiometer 124 - 20K
Capacitor 128 - 0.1 microfarad While certain specific embodiments of the present invention have been disclosed as typical, the invention is of course not limited to these particular forms, but rather is applicable broadly to all such variations as fall within the scope of the appended claims.

I claim:

1. The combination comprising:
   transmitter coil means at a first location within a well operable when energized by oscillating current to induce current in the surrounding earth formation;
   a first electrode contained in the earth in electrical contact with the earth formation at a level spaced beneath the upper surface of said formation;
   a conductor which extends upwardly from said first electrode through the earth formation and which is insulated from said formation;
   a second electrode electrically connected to the earth and located farther from said coil means than is said first electrode; and
   a signal receiving unit at an upper location connected to said first electrode through said conductor, and connected to said second electrode, and responsive to differences in potential between the two electrodes induced by said coil means.

2. The combination as recited in claim 1, in which said second electrode contacts the earth formation at a location spaced horizontally a substantial distance from the well.

3. The combination as recited in claim 1, including a drill string extending downwardly within the well and carrying said transmitter coil means at said first location deep within the well.

4. The combination as recited in claim 1, including a sensing instrument deep within the well responsive to a predetermined condition and controlling energization of said coil means to produce a signal receivable by said signal receiving unit at said upper location.

5. The combination as recited in claim 1, including a drill string extending downwardly within said well, said transmitting coil means being wound essentially toroidally about said drill string and having an essentially annular magnetic metal core disposed about the drill string and extending through the coil to induce a transmission current in the drill string.

6. The combination as recited in claim 1, including a tubular string extending downwardly within the well and carrying said coil means at said first location within the well, a direction responsive unit carried by said string at said first location, and means for controlling energization of said transmitter coil means in correspondence with changes in directional orientation of said string within the well as sensed by said unit, and thereby acting to vary said current induced in the earth formation by the coil means to produce a direction indicating signal intelligible to said signal receiving unit at said upper location.

7. The combination as recited in claim 1, including a tubular string extending downwardly within the well and carrying said coil means at said first location within the well, a gravity actuated sensing unit carried by said string at said first location and adapted to respond to rotation of the string about its axis when the string is inclined, and means responsive to said sensing unit to control energization of said transmitter coil means and thereby vary said current induced in the earth formation to produce signals intelligeable to said signal receiving unit at said upper location.

8. The combination comprising:
   transmitter coil means at a first location within a well operable when energized by oscillating current to induce current in the surrounding earth formation;
   a first electrode contained in the earth in electrical contact with the earth formation at a level spaced beneath the upper surface of said formation;
   a conductor which extends upwardly from said first electrode through the earth formation and is insulated therefrom;
   a second electrode electrically connected to the earth and located farther from said coil means than is said first electrode;
   a signal receiving unit at an upper location connected to said first electrode through said conductor, and connected to said second electrode, and responsive to differences in potential between the two electrodes induced by said coil means; and
   a casing extending downwardly into the well, said insulated conductor extending downwardly within the well along the outside of said casing.

9. The combination comprising:
   transmitter coil means at a first location within a well operable when energized by oscillating current to induce current in the surrounding earth formation;
   a first electrode contained in the earth in electrical contact with the earth formation at a level spaced beneath the upper surface of said formation;
   a conductor which extends upwardly from said first electrode through the earth formation and is insulated therefrom;
   a second electrode electrically connected to the earth and located farther from said coil means than is said first electrode;
   a signal receiving unit at an upper location connected to said first electrode through said conductor, and connected to said second electrode, and responsive to differences in potential between the two electrodes induced by said coil means; and
   a casing extending downwardly within the well, said conductor extending downwardly within the well at the outside of the casing and being secured to the casing in insulated relation.

10. The combination comprising:
    transmitter coil means at a first location within a well operable when energized by oscillating current to induce current in the surrounding earth formation;
    a first electrode contained in the earth in electrical contact with the earth formation at a level spaced beneath the upper surface of said formation;
    a conductor which extends upwardly from said first electrode through the earth formation and is insulated therefrom;
    a second electrode electrically connected to the earth and located farther from said coil means than is said first electrode; and
    a signal receiving unit at an upper location connected to said first electrode through said conductor, and connected to said second electrode, and responsive to differences in potential between the two electrodes induced by said coil means;
    said second electrode contacting the earth formation at a location higher than does said first electrode.

11. The combination comprising:

transmitter coil means at a first location within a well operable when energized by oscillating current to induce current in the surrounding earth formation;

a first electrode contained in the earth in electrical contact with the earth formation at a level spaced beneath the upper surface of said formation;

a conductor which extends upwardly from said first electrode through the earth formation and is insulated therefrom;

a second electrode electrically connected to the earth and located farther from said coil means than is said first electrode;

a signal receiving unit at an upper location connected to said first electrode through said conductor, and connected to said second electrode, and responsive to differences in potential between the two electrodes induced by said coil means;

a tubular string extending downwardly within said well and having an electrically conductive non-magnetic section at said first location within the well;

first and second essentially annular cores of magnetic material extending about said section of the string;

said coil means including first and second coils wound essentially toroidally about said cores respectively and about said section of the string;

a fluxgate direction sensing unit carried by said string;

a gravity actuated sensing unit carried by the string; and electronic circuitry carried by the string varying the frequencies of oscillating current energization of said two coils in correspondence with responses of said two sensing units to changes in position sensed thereby;

said signal receiving unit at said upper location being responsive to said frequency changes in currents transmitted through the earth formation to produce readouts of the conditions sensed by said sensing units.

12. The combination comprising:

transmitter coil means at a first location within a well operable when energized by oscillating current to induce current in the surrounding earth formation;

a first electrode contained in the earth in electrical contact with the earth formation at a level spaced beneath the upper surface of said formation;

a conductor which extends upwardly from said first electrode through the earth formation and is insulated therefrom;

a second electrode electrically connected to the earth and located farther from said coil means than is said first electrode;

a signal receiving unit at an upper location connected to said first electrode through said conductor, and connected to said second electrode, and responsive to differences in potential between the two electrodes induced by said coil means;

said first electrode being contained in a second well which extends downwardly into the earth at a location spaced from said first mentioned well, and being spaced beneath the surface of the earth formation;

said insulated conductor extending upwardly within said second well.

13. The combination comprising:

a first well;

transmitter coil means at a first location within said well operable when energized by oscillating current to induce current in the surrounding earth formation;

a second well extending downwardly into the earth formation at a location spaced from said first well and containing a casing;

a first electrode contained in said second well in electrical contact with the earth formation at a level spaced beneath the upper surface of said formation;

a conductor which extends upwardly from said first electrode within said second well and along the outside of said casing and which is insulated from the earth formation;

a second electrode electrically connected to the earth and located farther from said coil means than is said first electrode; and a signal receiving unit at an upper location connected to said first electrode through said conductor, and connected to said second electrode, and responsive to differences in potential between the two electrodes induced by said coil means.

14. The combination comprising:

a first well;

transmitter coil means at a first location within said well operable when energized by oscillating current to induce current in the surrounding earth formation;

a second well extending downwardly into the earth at a location spaced from said first well;

a plurality of first electrodes contained in said second well in electrical contact with the earth formation at levels spaced beneath the upper surface of said formation and spaced apart longitudinally of said second well;

a plurality of conductors which extend upwardly from said first electrode and within said second well and are insulated from the earth formation;

a second electrode electrically connected to the earth and located farther from said coil means than are said first electrodes; and a signal receiving unit at an upper location connected to said first electrodes through said conductors, and connected to said second electrode, and responsive to differences in potential between the first and second electrodes induced by said coil means.

15. The combination comprising:

transmitter coil means at a first location within a well operable when energized by oscillating current to induce current in the earth;

a first electrode at a subsurface location;

an insulated conductor connected to said first electrode and extending upwardly from said subsurface location;

a second electrode at a location farther from said coil means than is said first electrode; and a signal receiving unit connected to said first electrode through said insulated conductor, and connected to said second electrode, and responsive to differences in potential between the two electrodes induced by said coil means.

16. The combination comprising:

transmitter coil means at a first location within an offshore well and operable when energized by oscillating current to induce current in the earth formation and in a body of water thereabove;

a first electrode contacting said water at a level spaced beneath its surface;

a conductor which extends upwardly from said first electrode through said water and is insulated from the water;

a second electrode electrically connected to the water at a location farther from said coil means than is said first electrode; and a signal receiving unit connected to said first electrode through said conductor, and connected to said second electrode, and responsive to differences in potential between the two electrodes induced by said coil means.

17. The combination as recited in claim 16, including an offshore platform for said well having supporting legs, and means attaching said insulated conductor to one of said legs.

18. The combination as recited in claim 16, including an additional electrode electrically connected to the earth formation at a location beneath said body of water and connectable to said receiving unit in substitution for said first electrode.

19. The combination as recited in claim 16, including a plurality of additional electrodes electrically connected to the earth formation at different depths beneath said body of water, and a plurality of additional insulated conductors connected to said additional electrodes and extending upwardly to said receiving unit.

20. The method of transmitting signals from a well that comprises:

including an oscillating signal current in the earth surrounding the well by energization of transmitter coil means at a first location within the well; and receiving said signal current through two spaced electrodes, a first of which is subsurface and connected to a receiving unit by a conductor which is insulated as it extends upwardly from said subsurface location toward the surface; and the second of which is located farther from said coil means than is said first electrode.

21. The method as recited in claim 20, including varying the frequency of an oscillating current energizing said coil means to transmit signals to said signal receiving unit in frequency modulated form.

22. The method of transmitting signals from a well that comprises:

inducing an oscillating signal current in the earth surrounding the well by energization of transmitter coil means at a first location within the well; and receiving said signal current through two spaced electrodes, a first of which is in contact with a body of water above the earth formation and contacts the water at a location spaced beneath its surface and is connected to a receiving unit by a conductor extending upwardly through the water in insulated relation, and the second of which is located farther from said coil means than is said first electrode.

23. The method of transmitting signals from a well that comprises:

inducing an oscillating signal current in the earth surrounding the well by energization of transmitter coil means at a first location within the well; and receiving said signal current through two spaced electrodes, a first of which is in electrical contact with the earth formation at a location spaced beneath its surface and is connected to a receiving unit by a conductor extending upwardly through the earth formation in insulated relation, and the second of which is located farther from said coil means than is said first electrode.

24. The method that comprises:

drilling a first well into the earth;

positioning a first electrode in said first well in electrically conductive relation with the earth formation at a level spaced beneath the surface of the earth formation, and with an insulated conductor extending upwardly from said first electrode through said first well to an upper location;

positioning a second electrode in electrically conductive relation with the earth at a location spaced from said first electrode;

inducing an oscillating signal current in the earth formation by energization of transmitter coil means positioned within a second well spaced from the first well; and responding to differences in electrical potential between said first and second electrodes induced by said coil means.

25. The method as recited in claim 24, including positioning within said first well a plurality of said first electrodes spaced apart longitudinally of the first well and beneath the surface of the earth formation, and responding to signals transmitted through said different first electrodes by said coil means at different times.

26. The combination comprising:

a sub adapted to be connected into a well drilling string at a location above a directional drilling unit and having threads at its lower end through which the sub can be connected to a drilling unit, but with the relative rotary setting of the sub and drilling unit being unpredictable;

said sub containing a fluid passage extending longitudinally therethrough and having a side wall about said passage containing an instrument recess;

a sensing unit carried by said sub within said recess and responsive under at least some conditions to rotary movement of said sub about its longitudinal axis to different rotary positions;

means for transmitting from said sub to an upper location signals controlled by said sensing unit and conveying information sensed thereby;

a signal receiving unit at said upper location for responding to said transmitted signals; and means mounting said sensing unit within said recess in the sub wall for rotary adjusting movement relative to the sub about an axis extending longitudinally thereof and enabling the sensing unit to be turned to a predetermined rotary orientation relative to a directional drilling unit connected to the sub through said threads to thereby compensate for the unpredictability of the threaded connection.

27. The combination as recited in claim 26, including marking means on said sub for coacting with marking means on a directional drilling unit to indicate the relative rotary setting thereof and thereby determine the proper rotary setting of said sensing unit relative to the sub.

28. The combination as recited in claim 26, in which said sensing unit is a fluxgate assembly responsive to the earth's magnetic field to sense magnetic direction in the well.

29. The combination as recited in claim 26, in which said sensing unit is a gravity actuated part responsive to turning movement of said sub about its longitudinal axis when that axis is turned.

30. The combination as recited in claim 26, in which there are two of said sensing units carried by said sub and both mounted for said relative rotary adjusting movement relative to the sub, said transmitting means and said signal receiving unit being operable to transmit signals to said upper location controlled by both of said sensing units.

31. The combination as recited in claim 26, including an actuating part accessible from the outside of said sub for turning said sensing unit to different rotary settings relative to the sub.

32. The combination as recited in claim 26, including a worm gear on said sensing unit, and a worm accessible for rotation from the outside of said sub and engaging said worm gear within the sub to turn said sensing unit relative to the sub.

33. The combination as recited in claim 26, including a directional drilling unit connected to the lower end of said sub, and marking means for indicating the relative rotary setting between said sub and said directional drilling unit.

34. The combination as recited in claim 26, in which said transmitting means include an essentially annular core of magnetic material about said sub, and a toroidally wound coil on the core.

35. The combination as recited in claim 26, in which said sub is a tubular body of non-magnetic material having said threads at its lower end and having additional threads at its upper end for connection to an upper portion of the drill string, there being a second sensing unit contained in said recess at a side of said passage and mounted for rotary adjusting movement about an axis extending longitudinally of the sub, a removable cover for enclosing said recess in sealed relation, two separate worm and worm gear combinations actuable from the outside of the sub when the cover is in closed position to turn said sensing units rotatively relative to the sub, said transmitting means including two essentially annular cores of magnetic material about said sub and two essentially toroidally wound coils about the cores, and electronic circuitry for energizing said coils with frequency modulated oscillating current under the control of said sensing units respectively.

36. The combination as recited in claim 35, in which one of said sensing units is a fluxgate assembly responsive to the earth's magnetic field, and the other of said sensing units is a gravity actuated unit responsive to rotary movement of that sensing unit about an axis extending longitudinally of the sub when the sub is inclined.

37. The combination as recited in claim 36, including marking means for indicating the relative rotary setting of said sub relative to a directional drilling unit connected thereto, to thereby determine proper rotary settings for said sensing units.

38. The combination comprising:
   a body adapted to be connected into a well drilling string and having a side wall;
   a sensing unit carried by said body and responsive under at least some conditions to rotary movement of said body about the longitudinal axis of said string to different rotary positions;
   means for transmitting from essentially the location of said body to an upper location signals controlled by said sensing unit and conveying information sensed thereby;
   a signal receiving unit at said upper location for responding to said transmitted signals;
   means mounting said sensing unit to said body for rotary adjusting movement relative thereto about an axis extending longitudinally of the string; and
   an actuating element accessible at the outer side of said side wall of said body and operable to turn said sensing unit relative to said body.

39. The combination as recited in claim 38, including a worm gear on said sensing nut, said actuating element being a worm accessible for rotation from the outside of said side wall and engaging said worm gear to turn the sensing unit relative to said body.

* * * * *